(12) United States Patent
Lee et al.

(10) Patent No.: US 9,197,884 B2
(45) Date of Patent: Nov. 24, 2015

(54) SYSTEM, APPARATUS, AND METHOD FOR DISPLAYING 3-DIMENSIONAL IMAGE AND LOCATION TRACKING DEVICE

(75) Inventors: Kyoungil Lee, Seoul (KR); Dongman Jeong, Seoul (KR); Taesoo Park, Seoul (KR); Dongha Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 741 days.

(21) Appl. No.: 13/205,786

(22) Filed: Aug. 9, 2011

(65) Prior Publication Data

US 2012/0032952 A1 Feb. 9, 2012

(30) Foreign Application Priority Data

Aug. 9, 2010 (KR) .......................... 10-2010-0076495

(51) Int. Cl.

| | |
|---|---|
| G09G 5/00 | (2006.01) |
| H04N 13/04 | (2006.01) |
| G06T 11/00 | (2006.01) |
| G06F 3/0485 | (2013.01) |
| G06F 1/16 | (2006.01) |

(52) U.S. Cl.
CPC .......... *H04N 13/0477* (2013.01); *G06F 1/1694* (2013.01); *G06F 3/0485* (2013.01); *G06T 11/00* (2013.01); *G09G 2320/0261* (2013.01); *H04N 13/0409* (2013.01)

(58) Field of Classification Search
CPC ... G06F 3/0485; G06F 1/1626; G06F 1/1694; G06T 11/00; G09G 2320/0261
USPC ................. 348/42, 51, 54, 60, 222.1, 333.11; 345/672, 419, 156, 420, 427, 204
See application file for complete search history.

(56) References Cited

U.S. PATENT DOCUMENTS

| | | | | |
|---|---|---|---|---|
| 4,987,487 | A | * | 1/1991 | Ichinose et al. .................. 348/59 |
| 5,287,437 | A | | 2/1994 | Deering ......................... 395/127 |
| 5,936,774 | A | | 8/1999 | Street ............................. 359/630 |
| 6,089,750 | A | * | 7/2000 | Murakami et al. ............. 374/124 |
| 6,157,749 | A | * | 12/2000 | Miyake ......................... 382/300 |

(Continued)

FOREIGN PATENT DOCUMENTS

| | | |
|---|---|---|
| CN | 1512456 A | 7/2004 |
| CN | 1791230 A | 6/2006 |

(Continued)

OTHER PUBLICATIONS

Chinese Office Action dated Oct. 25, 2013 issued in Application No. 201110280613 (with English translation).

(Continued)

*Primary Examiner* — Abderrahim Merouan
(74) *Attorney, Agent, or Firm* — KED & Associates LLP

(57) ABSTRACT

A system, apparatus, and method for displaying a 3D image and a location tracking device are provided. A location tracking unit receives an image frame acquired by capturing an image of a user, detects a location of the user using the received image frame, calculates a movement velocity of the user using the detected location of the user and at least one of previously detected locations of the user, predicts a location of the user at time point which a predetermined time elapses using the detected location of the user and the calculated movement velocity, and calculates a 3D image change amount based on the predicted location of the user. An image processing unit performs a control operation to display a 3D image based on the calculated 3D image change amount.

17 Claims, 10 Drawing Sheets

(56) References Cited

U.S. PATENT DOCUMENTS

| | | | |
|---|---|---|---|
| 6,710,920 B1* | 3/2004 | Mashitani et al. | 359/463 |
| 7,034,846 B2* | 4/2006 | Dawson | 345/611 |
| 7,046,272 B2* | 5/2006 | Schwerdtner | 348/51 |
| 7,064,771 B1* | 6/2006 | Jouppi et al. | 345/614 |
| 7,719,621 B2* | 5/2010 | Tsuboi et al. | 349/15 |
| 7,876,971 B2* | 1/2011 | Gardella et al. | 382/254 |
| 8,179,449 B2* | 5/2012 | Larsson et al. | 348/222.1 |
| 2002/0015007 A1* | 2/2002 | Perlin et al. | 345/6 |
| 2005/0179698 A1* | 8/2005 | Vijayakumar et al. | 345/611 |
| 2005/0259302 A9* | 11/2005 | Metz et al. | 359/15 |
| 2006/0038881 A1* | 2/2006 | Starkweather et al. | 348/51 |
| 2006/0119572 A1 | 6/2006 | Lanier | 345/156 |
| 2006/0170764 A1* | 8/2006 | Hentschke | 348/42 |
| 2006/0227103 A1* | 10/2006 | Koo et al. | 345/156 |
| 2007/0019936 A1* | 1/2007 | Birkenbach et al. | 396/14 |
| 2008/0278564 A1* | 11/2008 | Meinders et al. | 347/232 |
| 2010/0060983 A1* | 3/2010 | Wu et al. | 359/466 |
| 2010/0104266 A1* | 4/2010 | Yashiro et al. | 386/122 |
| 2010/0118205 A1 | 5/2010 | Sohma et al. | 348/700 |
| 2010/0295958 A1* | 11/2010 | Larsson et al. | 348/222.1 |
| 2010/0315492 A1* | 12/2010 | Baik et al. | 348/51 |
| 2011/0051239 A1* | 3/2011 | Daiku | 359/464 |
| 2011/0169822 A1* | 7/2011 | Gardella et al. | 345/419 |
| 2011/0249181 A1* | 10/2011 | Iwami et al. | 348/501 |
| 2013/0314431 A1* | 11/2013 | Salvi | 345/589 |

FOREIGN PATENT DOCUMENTS

| | | |
|---|---|---|
| CN | 1841126 A | 10/2006 |
| CN | 101668220 A | 3/2010 |
| WO | WO 03/013153 A1 | 2/2003 |
| WO | WO 2009/145640 A1 | 12/2009 |

OTHER PUBLICATIONS

European Search Report dated Apr. 16, 2014 issued in Application No. 11006555.4-1902.

* cited by examiner

SYSTEM, APPARATUS, AND METHOD FOR DISPLAYING 3-DIMENSIONAL IMAGE AND LOCATION TRACKING DEVICE

This application claims the benefit of Korean Patent Application No. 10-2010-0076495, filed on Aug. 9, 2010, which is hereby incorporated by reference as if fully set forth herein.

BACKGROUND OF THE INVENTION

1. Field of the Invention

The present invention relates to a system, apparatus, and method for displaying a 3-dimensional image and a location tracking device, and more particularly, to a glassless 3D display.

2. Discussion of the Related Art

In recent years, display technology for representing 3-Dimensional (3D) images has been studied and utilized in a variety of fields. In particular, electronic devices for displaying 3D images using 3D display technology have been a focus of attention.

3D display technology uses a binocular disparity based method that provides stereoscopic sensation to the user using different views of the left and right eyes. 3D display technology is classified into a shutter glass method, a glassless method, and a complete stereoscopic method. However, the shutter glass method has a drawback in that a user must wear additional equipment such as polarizing glasses and the glassless method has a drawback in that a user can view a 3D image only from a particular position. Due to these drawbacks of the shutter glass method and the glassless method, the complete stereoscopic method has been actively studied recently.

SUMMARY OF THE INVENTION

Accordingly, the present invention is directed to a system, apparatus, and method for displaying a 3-dimensional image and a location tracking device that substantially obviate one or more problems due to limitations and disadvantages of the related art.

An object of the present invention is to provide a system, apparatus, and method for displaying a 3-dimensional (3D) image and a location tracking device for extending viewing angle.

Another object of the present invention is to provide a system, apparatus, and method for displaying a 3D image and a location tracking device for preventing the occurrence of 3D image flickering and crosstalk when the user is in motion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a 3-dimensional (3D) display method may include sensing a user, obtaining, based on the sensed information, user location information about location of the user, calculating, using the obtained user location information, user location prediction information about a predicted location of the user, calculating a 3D image change amount according to the calculated user location prediction information and displaying a 3D image based on the calculated 3D image change amount. Here, the sensed information may include at least one of a captured image, a distance value sensed via infrared light or a distance value sensed via radio wave. The 3D image change amount may be one of a pixel displacement and a sub-pixel displacement. The sensing the user includes capturing an image of the user. The obtaining the user location information includes detecting a location of the user using an image frame included in a captured image. The calculating the user location prediction information includes calculating a movement velocity of the user using a detected location of the user and at least one of previously detected locations of the user and predicting a location of the user at a time point which a predetermined time elapses using the detected location of the user and the calculated movement velocity.

In another aspect of the present invention, a 3-dimensional (3D) display method may include capturing an image of a user, detecting a location of the user using an image frame included in the captured image, calculating a movement velocity of the user using the detected location of the user and at least one of previously detected locations of the user, predicting a location of the user at a time point which a predetermined time elapses using the detected location of the user and the calculated movement velocity, calculating a 3D image change amount based on the predicted location of the user, and displaying a 3D image based on the calculated 3D image change amount. Here, the 3D image change amount may be one of a pixel displacement and a sub-pixel displacement.

Preferably, the displaying may include displaying the 3D image by moving one of a pixel position at which a pixel color included in the 3D image is displayed or a sub-pixel position at which a sub-pixel color included in the 3D image is displayed according to the 3D image change amount.

Preferably, the predicting may include predicting a location of the user at one or more time points between when the predetermined time elapses and when an image frame next to the image frame is captured.

Preferably, the predicting may include predicting a location of the user at each time point at intervals of a predetermined period between when the predetermined time elapses and when an image frame next to the image frame is captured.

Preferably, the predetermined period may be less than a period at intervals of which the 3D image changes.

Preferably, the predetermined time may be a time that elapses until the 3D image is displayed after the image frame is captured.

Preferably, the 3D image may be a 2-view image or a multi-view image.

Preferably, the 3D display method may further include generating a view mask for the 3D image, and determining a final color of a sub-pixel using both the generated view mask and a color of a sub-pixel of a view image included in the 3D image.

Preferably, the displaying may include displaying the final color of the sub-pixel at a sub-pixel located at a position to which the sub-pixel has moved according to the 3D image change amount.

In another aspect of the present invention, a 3-dimensional (3D) display apparatus may include a location tracking unit configured to receive an image frame acquired by capturing an image of a user, detect a location of the user using the received image frame, calculate a movement velocity of the user using the detected location of the user and at least one of previously detected locations of the user, predict a location of the user after a predetermined time elapses using the detected location of the user and the calculated movement velocity, and calculate a 3D image change amount based on the predicted location of the user, and an image processing unit configured to control to display a 3D image based on the calculated 3D image change amount. Here, the 3D change amount may be one of a pixel displacement and a sub-pixel displacement.

Preferably, the image processing unit may perform a control operation to display the 3D image by moving one of a pixel position at which a pixel color included in the 3D image is displayed or a sub-pixel position at which a sub-pixel color included in the 3D image is displayed according to the 3D image change amount.

Preferably, the location tracking unit may predict a location of the user at one or more time points between when the predetermined time elapses and when an image frame next to the image frame is captured and calculate a 3D image change amount using the predicted location of the user.

Preferably, the location tracking unit may predict locations of the user at intervals of a specific period between when the predetermined time elapses and when an image frame next to the image frame is captured and calculate a 3D image change amount of each of the predicted locations of the user.

Preferably, the specific period may be less than a period at intervals of which the 3D image changes.

Preferably, the predetermined time may be a time that elapses until the 3D image is displayed after the image frame is captured.

Preferably, the 3D image may be a 2 view image or a multi-view image.

Preferably, the image processing unit may generate a view mask for the 3D image and determine a final color of a sub-pixel using both the generated view mask and a color of a sub-pixel of a view image included in the 3D image.

Preferably, the image processing unit may perform a control operation to display the final color of the sub-pixel at a sub-pixel located at a position to which the sub-pixel has moved according to the 3D image change amount.

In further aspect of the present invention, a 3-dimensional (3D) display system may include a camera configured to capture an image of a user, a location tracking unit configured to detect a location of the user using an image frame included in the captured image, calculate a movement velocity of the user using the detected location of the user and at least one of previously detected locations of the user, predict a location of the user after a predetermined time elapses using the detected location of the user and the calculated movement velocity, and calculate a 3D image change amount based on the predicted location of the user, an image processing device configured to perform a control operation to display a 3D image based on the calculated 3D image change amount, and a display device configured to display the 3D image.

In another aspect of the present invention, a location tracking device may include a location tracking unit configured to receive an image frame acquired by capturing an image of a user and detect a location of the user using the received image frame, a velocity calculator configured to calculate a movement velocity of the user using the detected location of the user and at least one of previously detected locations of the user, a location estimator configured to predict a location of the user at a time point which a predetermined time elapses using the detected location of the user and the calculated movement velocity, and a change amount calculator configured to calculate a 3D image change amount based on the predicted location of the user and output the calculated 3D image change amount.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
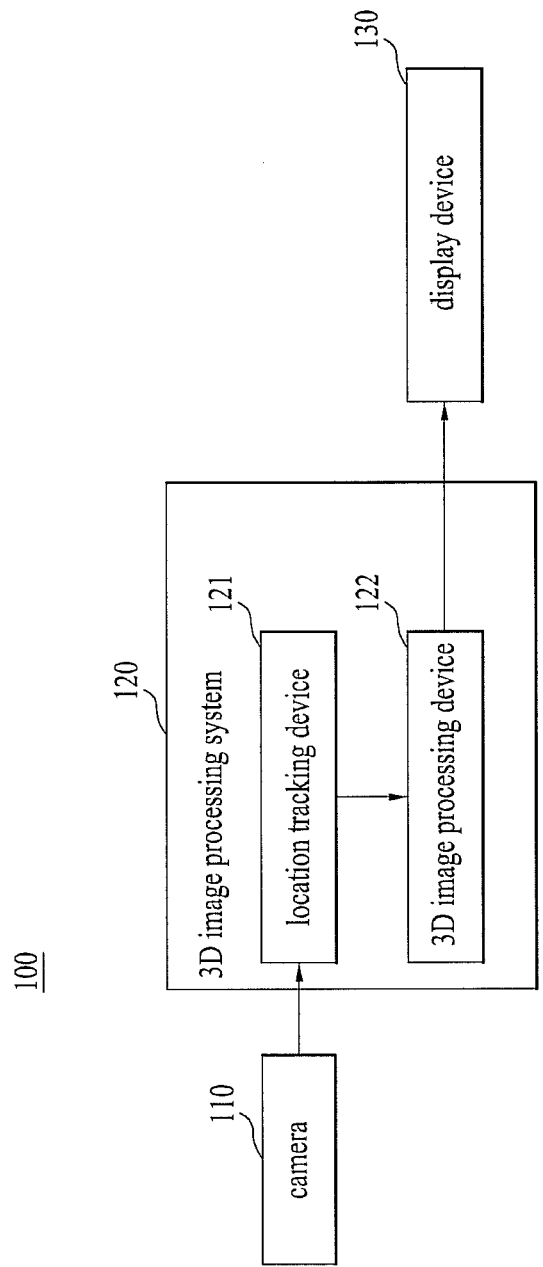
FIG. 1 is a block diagram showing a configuration of a preferred embodiment of a 3D display system according to the present invention.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

FIG. 1 is a block diagram showing a configuration of a preferred embodiment of a 3D display system according to the present invention.

As shown in FIG. 1, the 3D display system 100 according to the present invention may include a camera 110, a 3D image processing system 120, and a display device 130. The 3D display system 100 may be a personal computer such as a desktop, laptop, tablet, or handheld computer. The 3D display system 100 may be a mobile terminal such as a mobile phone, a smartphone, a digital broadcast terminal, a Personal Digital Assistant (PDA), a Portable Multimedia Player (PMP), or a navigation terminal and may also be a stationary household appliance such as a digital TV. The 3D display system 100 may further include at least one of a camera 110, an infrared radiation distance measurement device or a radio wave distance measurement device as a device for sensing a location of a user. The infrared radiation distance measurement device outputs infrared radiation, receives the infrared radiation reflected by the user and senses a distance value of the user using the received infrared radiation. The radio wave distance measurement device receives radio wave output by a device attached with the user and senses a distance value of the user using the received radio wave.

The camera 110 captures an image of a user. The camera 110 may have various frame rates (in Hertz) and output an image frame acquired by capturing an image of the user to the 3D image processing system 120 according to a set or given frame rate. When the frame rate of the camera 110 has been set to 25 Hz, the camera 110 may capture 25 image frames per second and output the captured image frames to the 3D image processing system 120.

The 3D image processing system 120 predicts a location of the user after a predetermined time through the image frames output from the camera 110 and performs a control operation to display a 3D image according to the predicted location. The 3D image processing system 120 may include a location tracking device 121 and a 3D image processing device 122. The 3D image processing system 120 may be implemented as one product. For example, the 3D image processing system 120 may be implemented as a set-top box.

The location tracking device 121 receives image frames acquired by capturing an image of the user from the camera 110 and detects a location of the user using the received image frames. The location tracking device 121 calculates a movement velocity of the user using the detected location of the user and at least one of previously detected locations of the user. The location tracking device 121 predicts a location of the user after a predetermined time elapses using the calculated movement velocity and the detected location of the user and calculates a 3D image change amount based on the predicted user location.

The location tracking device 121 may be implemented as one module and the location tracking device module may be inserted into the 3D image processing device 122 to be provided as a single product. The 3D image processing system 120 may perform functions of the location tracking device 121 by executing a program, which performs the functions of the location tracking device 121, through a controller.

The 3D image processing device 122 performs a control operation to display a 3D image based on the 3D image change amount calculated by the location tracking device 121. The 3D image processing device 122 may be a broadcast receiver that encodes a received 3D image signal or a stored 3D image file. The broadcast receiver may be a broadcast receiver that can receive broadcasts transmitted through terrestrial waves, satellites, or cables and broadcasts transmitted through the Internet.

The broadcast receiver may be a broadcast receiver that can provide an Internet service to the user. The Internet services may be any service that can be provided through the Internet, including a Content on Demand (CoD) service, a YouTube service, an information service such as a weather, news, local information, or search service, an entertainment service such as a game service or a song room (karaoke) service, or a TV communication service such as a TV mail service or a TV Short Message Service (SMS) service. Thus, in the present invention, the broadcast receiver includes a network TV, a web TV, and a broadband TV.

The broadcast receiver may be a smart TV that may receive an application from the server through a network and then may install and execute the application.

A broadcast service may include not only a broadcast service that is provided through terrestrial waves, satellites and cables but also an Internet service. The broadcast service may provide not only a 2D image but also a 3D image. The 3D image may be 2-view or a multi-view image. The multi-view image includes a plurality of images acquired by capturing the same subject using a plurality of cameras having specific distances and angles and an image captured through each camera is defined as a view image.

The display device 130 displays a 3D image under control of the 3D image processing system 120. The display device 130 may be a multi-view barrier-based glassless 3D display and may be a lenticular-based glassless 3D display. The display device 130 may be implemented as an independent product and may also be implemented integrally with the 3D image processing system 120 or the 3D image processing device 122. The display device 130 may be a glassless 3D display whose view format is sub-pixel-based or pixel-based.

Figure 2:
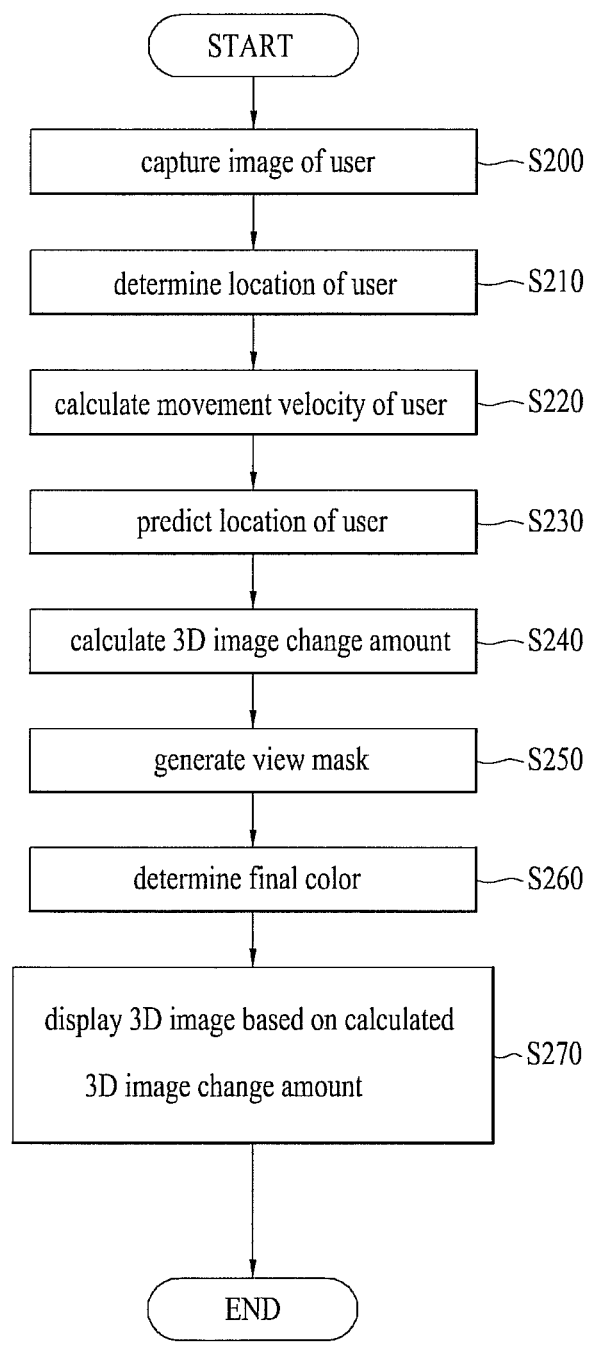
FIG. 2 is a flow chart illustrating a procedure for performing a 3D display method according to a preferred embodiment of the present invention.

FIG. 2 is a flow chart illustrating a procedure for performing a 3D display method according to a preferred embodiment of the present invention.

As shown in FIG. 2, the camera 110 captures images of the user (S200). The camera 110 may capture images of the user according to a set frame rate or a given frame rate and may continuously output the captured images to the 3D image processing system 120 in real time.

The 3D image processing system 120 detects a location of the user using image frames included in the images captured by the camera 110 (S210). Here, the 3D image processing system 120 may obtain a user location information about the detected location of the user.

The 3D image processing system 120 calculates a movement velocity of the user using the obtained user location information (S220). The obtained user location information indicates the detected location of the user and at least one of previously detected locations of the user. That is, the 3D image processing system 120 may calculate the movement velocity of the user using the detected location of the user and at least one of previously detected locations of the user. Here, in one embodiment, the 3D image processing system 120 may calculate a distance between the currently detected location of the user and a previously detected location of the user and a movement direction of the user based on the currently detected location of the user and the previously detected location of the user and then may calculate a movement velocity of the user by dividing the calculated distance by a time interval between each image frame capture. In another embodiment, the 3D image processing system 120 may obtain a vector sum of the currently calculated velocity and at least one of previous calculated velocities.

The 3D image processing system 120 calculates user location prediction information using the obtained user location information and the calculated movement velocity (S230). The user location prediction information indicates a predicted location of the user. For example, the user location prediction information may indicate a user location at a time point which a predetermined time elapses. The 3D image processing system 120 predicts a user location at a time point which a predetermined time elapses using the detected location and the calculated movement velocities of the user. Here, the 3D image processing system 120 may predict the location of the user at each specific time between each image frame capture time and may predict the location of the user at intervals of a predetermined period.

The 3D image processing system 120 may predict a location of the user at each specific time between when a predetermined time elapses after the image frame is captured and when a next image frame is captured and may predict a location of the user at intervals of a specific period. Here, the predetermined time may be a time that elapses until a 3D image is displayed according to a 3D image change amount calculated based on the location of the user predicted using the image frame after the image frame is captured. The specific period may be less than a period at intervals of which the display location of the 3D image changes.

The 3D image processing system 120 calculates a 3D image change amount according to the calculated user location prediction information (S240). The 3D image processing system 120 calculates a 3D image change amount based on the predicted location of the user indicated by the user location prediction information. The 3D image change amount may be one of a pixel displacement or a sub-pixel displacement.

The 3D image processing system 120 generates a view mask for a 3D image (S250).

The 3D image processing system 120 determines a final color of each sub-pixel of each view image included in the 3D image using the current color of the sub-pixel and the generated view mask (S260).

The 3D image processing system 120 controls the display device 130 so as to display the 3D image based on the calculated 3D image change amount (S270). The display device 130 may display the 3D image by moving pixel positions, at which pixel colors of the 3D image are displayed, by the calculated 3D image change amount from their original positions. In addition, the display device 130 may display the 3D image by moving sub-pixel positions, at which sub-pixel colors of the 3D image are displayed, by the calculated 3D image change amount from their original positions. Here, the sub-pixel colors of the 3D image may be final colors calculated in step S260.

Figure 3:
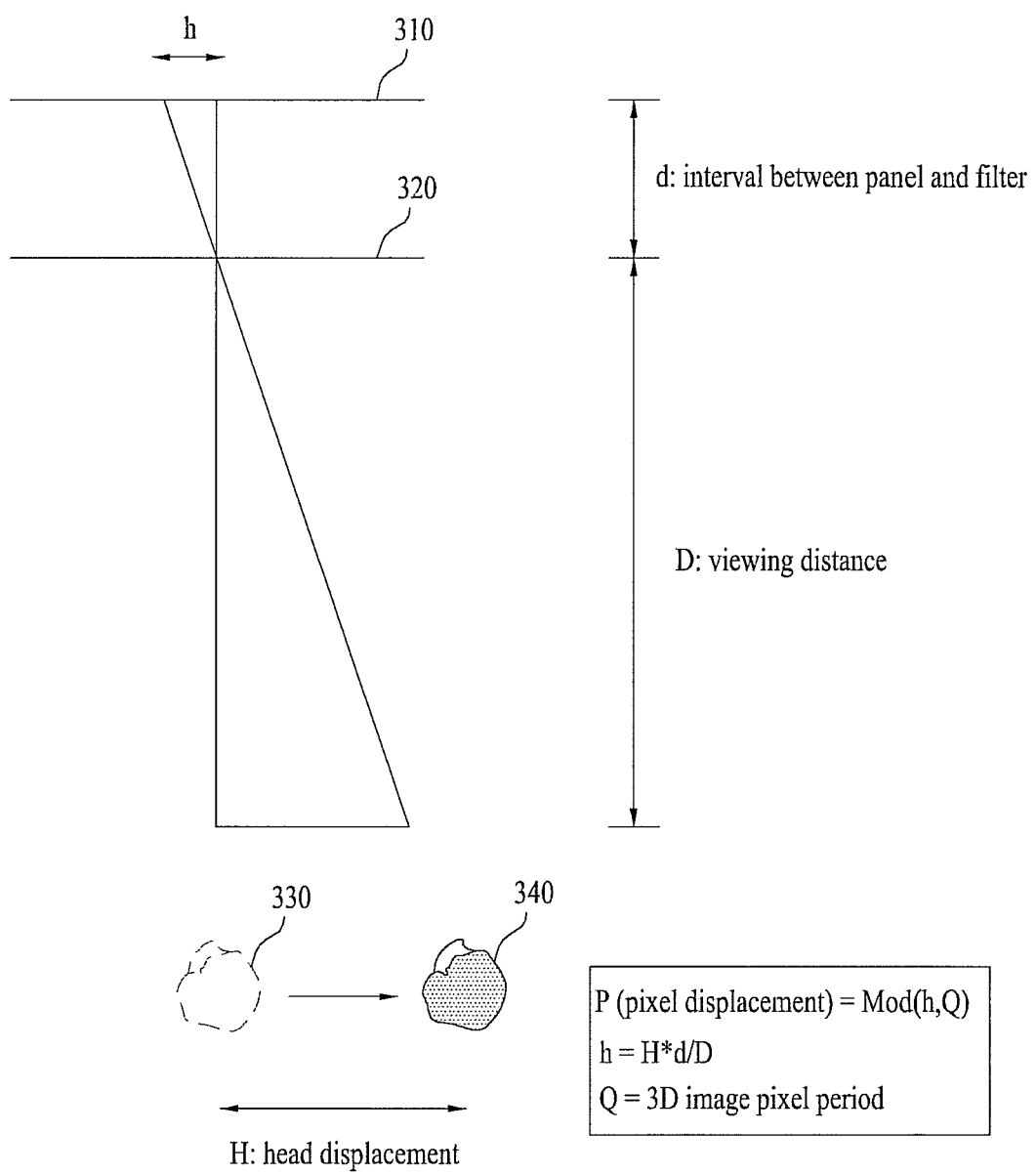
FIG. 3 illustrates a 3D image change amount calculated according to user location change.
Figure 4A:
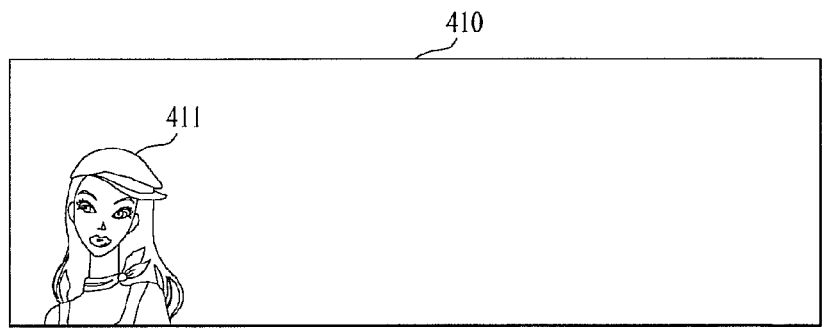
FIGS. 4A to 4D illustrate image frames that a 3D display system acquires by capturing an image of a user according to the present invention.
Figure 4B:
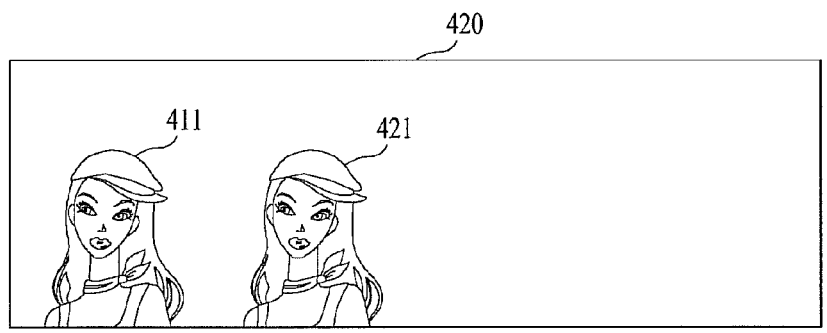
Figure 4C:
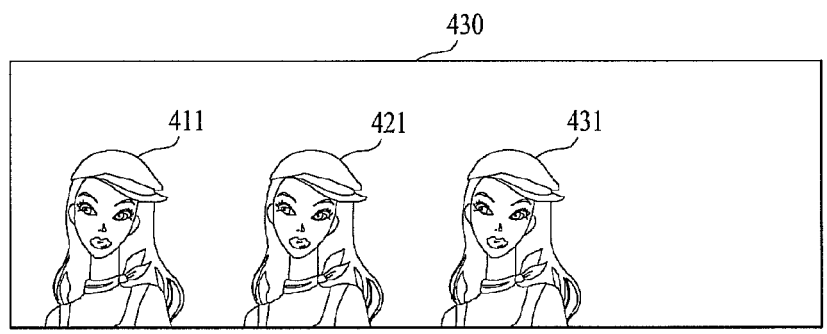
Figure 4D:
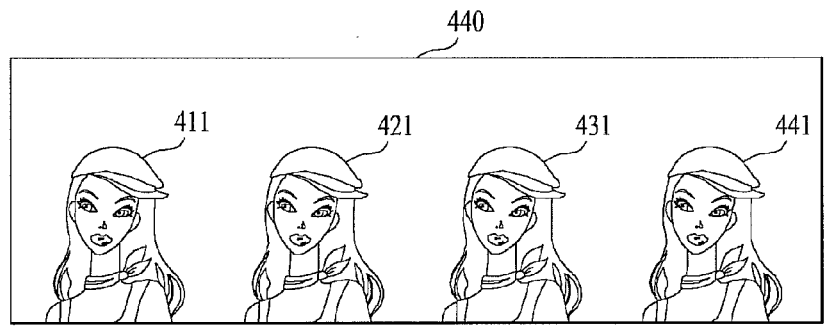

FIG. 3 illustrates a 3D image change amount calculated according to user location change.

As shown in FIG. 3, when a user moves from a location 330 to a location 340, a displacement h of a sightline location on the display panel 310 may be calculated from the following Expression 1.

$$h = H * d / D$$ [Expression 1]

Here, "H" denotes a head displacement of the user, "D" denotes a viewing distance between a 3D image filter 320 and the eyes of the user, and "d" denotes an interval between the display panel 310 and the 3D image filter 320.

When the user moves from the location 330 to the location 340, a pixel displacement P, which is an example of the 3D image change amount, may be calculated from the following Expression 2.

$$P = Mod(h, Q)$$ [Expression 2]

Here, Q is a 3D image pixel period.

FIGS. 4A to 4D illustrate image frames that a 3D display system acquires by capturing an image of a user according to the present invention.

As shown in FIGS. 4A to 4D, the 3D image processing system 120 may detect a location 421 of the user using an image frame 420. The 3D image processing system 120 may recognize a face region in the image frame 420 to detect a location 421 of the user. Here, the 3D image processing system 120 may recognize a face region using an algorithm which uses face symmetry, an algorithm which uses hair color and face color, and an algorithm which uses face profile. The 3D image processing system 120 may calculate skin color information from the image frame 420 to recognize a face region.

The 3D image processing system 120 may calculate a movement velocity V of the user using the detected location of the user 421 and a previously detected location of the user 411 according to the following Expression 3.

$$V = H / T$$ [Expression 3]

Here, "H" denotes a distance between the detected location of the user 421 and the previously detected location of the user 411 and "T" denotes a time interval between when the image frame 410 is captured and when the image frame 420 is captured.

The 3D image processing system 120 may calculate a location of the user after a predetermined time elapses using the detected user location 421 and the movement velocity V according to the following algorithm.

[Algorithm 1]
for (k=1, k, N+1, k++)
{user location at delay time+kt}

Here, "delay time" is a predetermined time and the delay time may be a delay time caused by at least one of a camera capture delay, a detecting process delay, and an image driver frame rate delay.

In addition, "t" may be determined based on the following Expression 4.

$$t = (1/M)/N$$ [Expression 4]

Here, "M" is a maximum frame rate of the camera and "N" may be determined based on the following Expression 5.

$$N > (V*t)/T$$ [Expression 5]

Here, "T" is a threshold head location change which causes an image change.

The location P of the user at time "delay time+kt" may be calculated based on the following Expression 6.

$$P = P_0 + VT$$ [Expression 6]

Here, "$P_0$" is a detected location of the user and "T" is "delay time+kt".

According to the algorithm 1, the 3D image processing system 120 may predict N locations of the user at intervals of the time "t" during an image frame capture interval. When a camera which captures images at a frame rate of M Hz is used, it is possible to achieve the same effects as when a camera which captures images at a frame rate of M*N Hz is used.

At the time point when an image frame 430 is captured, the 3D image processing system 120 detects a location 431 of the user and may calculate a movement velocity of the user using at least one of the previously detected locations 411 and 421 of the user.

In addition, at the time point when an image frame 440 is captured, the 3D image processing system 120 detects a location 441 of the user and may calculate a movement velocity of the user using at least one of the previously detected locations 411, 421, and 431 of the user.

Figure 5A:
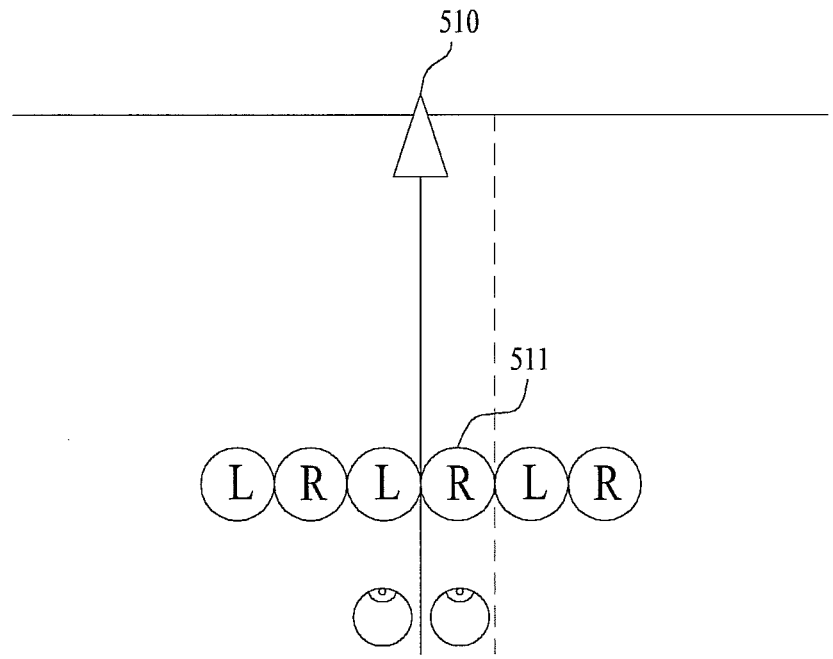
FIGS. 5A and 5B illustrate change of a displayed 3D image depending on the location of a user.
Figure 5B:
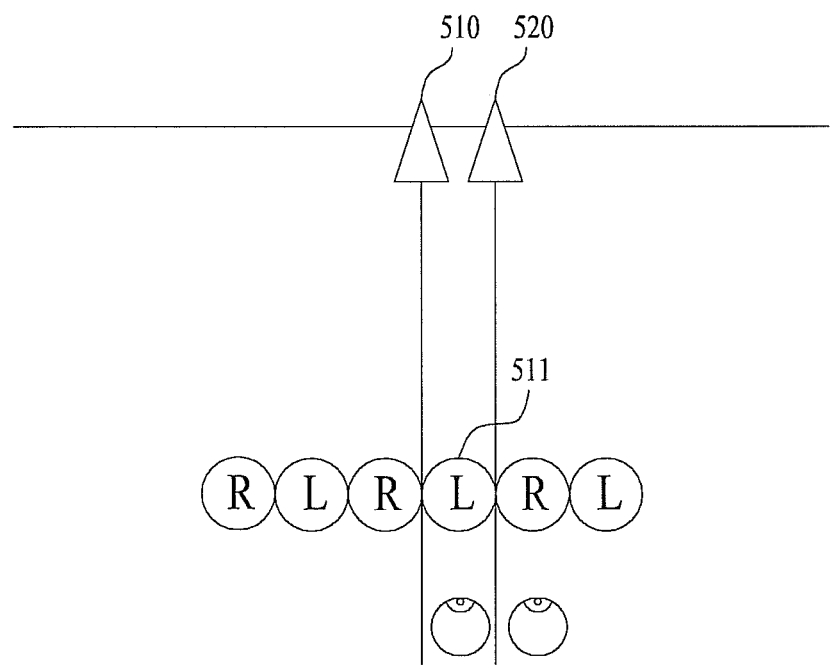

The 3D image processing system 120 may calculate a pixel displacement at a specific time based on a user location predicted at the specific time using Expressions 1 and 2. As shown in FIG. 5A, when the user is located at a location 510, a right-eye image R is displayed at a location 511 on a display panel. As shown in FIG. 5B, the 3D image processing system 120 predicts a location 520 of the user to which the user is to move at a specific time and calculates a pixel displacement 1 according to the predicted location 520. When the user has moved from the location 510 to the location 520, the 3D image processing system 120 performs a control operation to move a 3D image according to the pixel displacement 1 calculated for the specific time and to display a left-eye image L at the location 511 on the display panel.

Figure 6A:
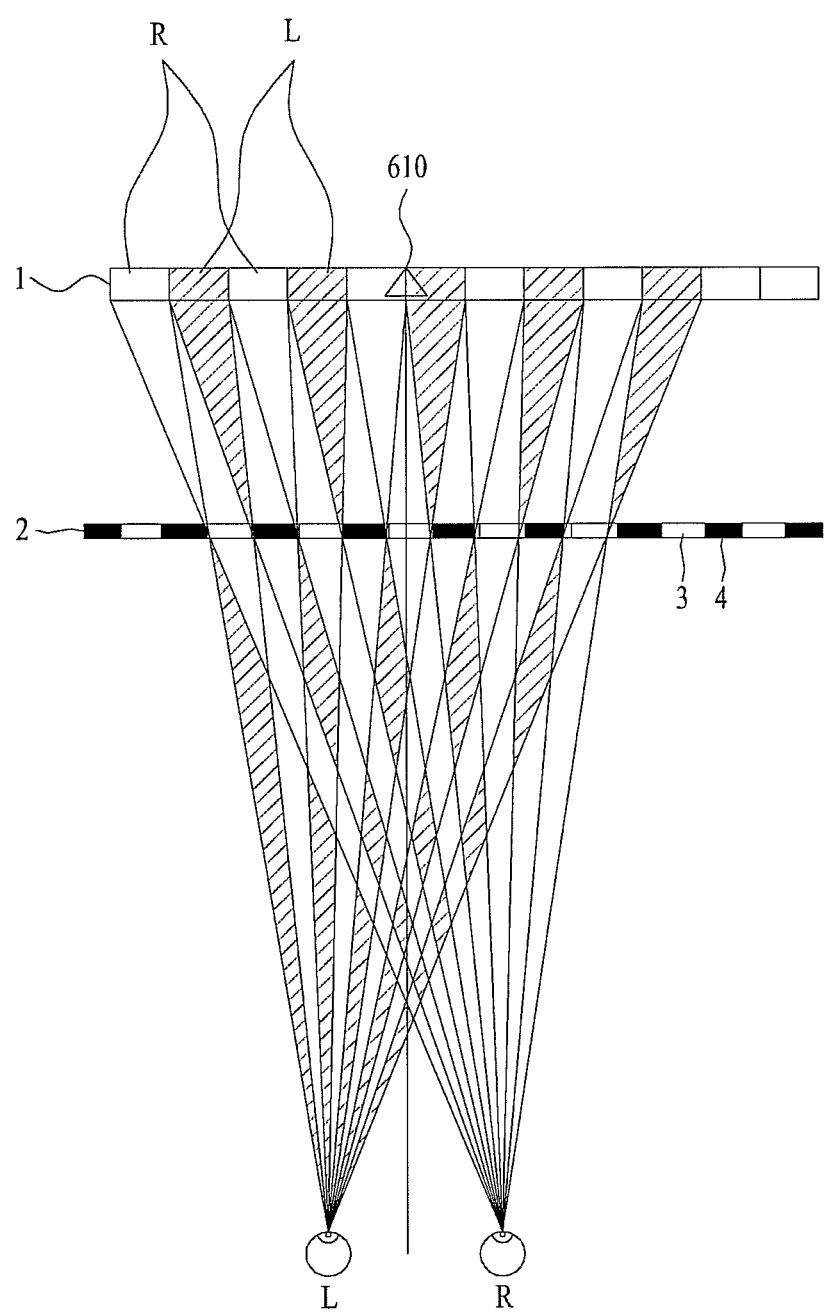
FIGS. 6A and 6B illustrate change of a displayed 3D image depending on the location of the user in a barrier scheme.
Figure 6B:
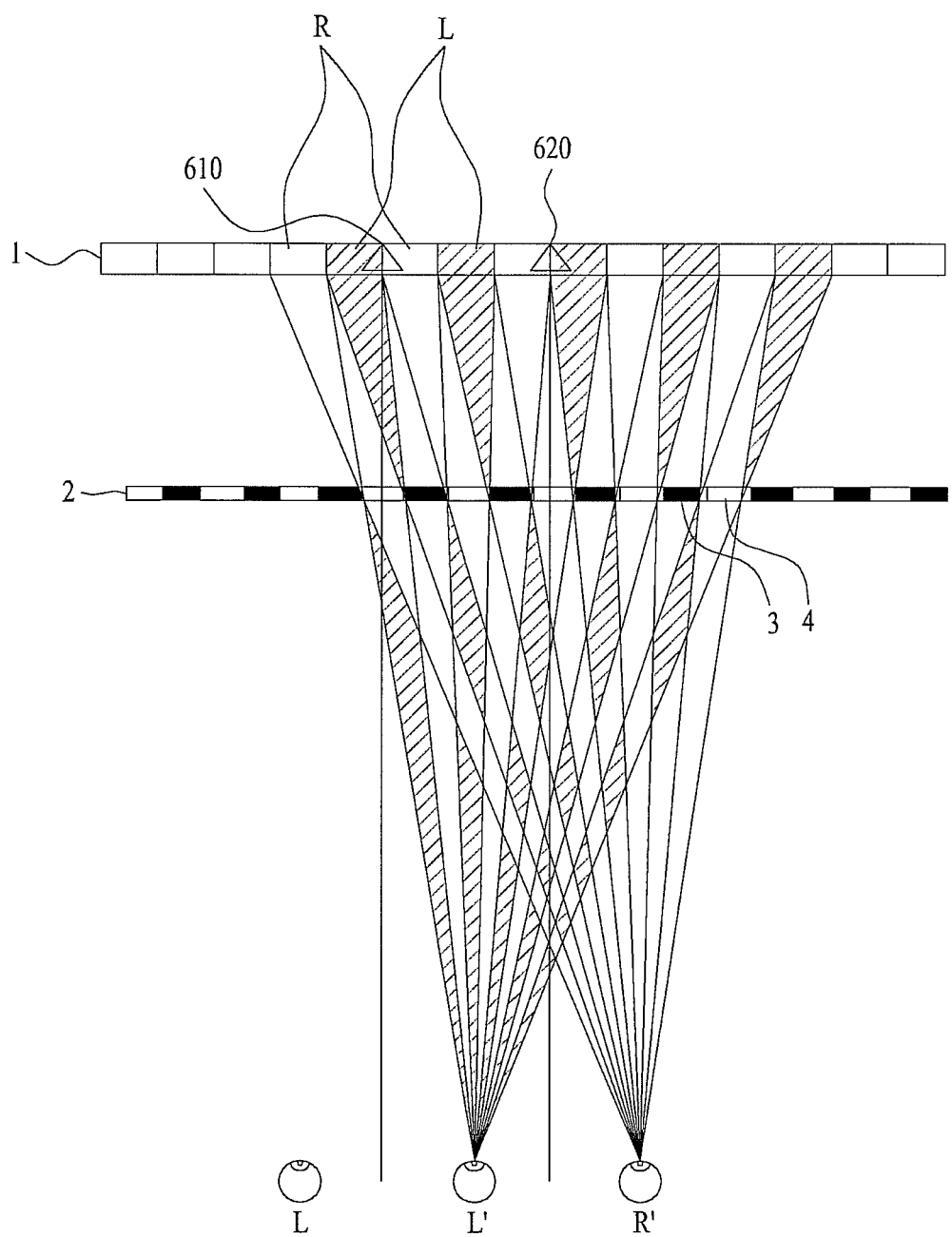

FIGS. 6A and 6B illustrate change of a displayed 3D image depending on the location of the user in a barrier scheme.

As shown in FIGS. 6A and 6B, a barrier type 3D display may include a display panel 1 which displays parallax images including a mixture of a left-eye image L and a right-eye image R and a parallax barrier 2 on which transparent regions 3 and non-transparent regions 4 are arranged at specific intervals for providing a 3D image to the user using such multi-view images.

The parallax barrier 2 may be arranged in front of the display panel 1 at a specific distance from the display panel 1 and the transparent regions 3 and the non-transparent regions 4 may be alternately arranged in a horizontal direction. The parallax barrier 2 may be implemented as a flat panel display such as an LCD panel.

When the user views parallax images corresponding to a left eye L and a right eye R of the user, which are displayed on the display panel 1, through the parallax barrier 2, the user separately views the left-eye image L and the right-eye image R provided from the display panel 1 to achieve a stereoscopic effect.

When the user is located at a location 610, a right-eye image R is displayed on the display panel 1 at the left side of a location 610 corresponding to the location 610 of the user and a left-eye image L is displayed on the display panel 1 at the right side of the location 610.

When the user is expected to move from the location 610 to a location 620, the 3D image processing system 120 previously calculates a 3D image change amount which allows a left-eye image L to be displayed at the left side of the location 610 on the display panel 1 and allows a right-eye image R to be displayed at the right side. At the time when the user is located at the location 620, the 3D image processing system 120 may control the display panel 1 to display a left-eye image L at the left side of the location 610 on the display panel 1 and to display a right-eye image R at the right side.

Figure 7:
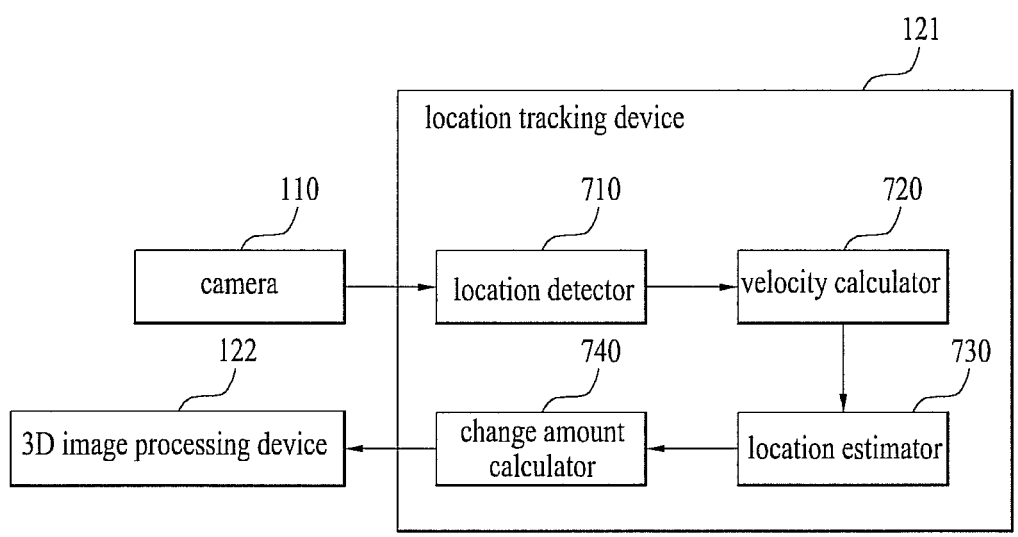
FIG. 7 is a block diagram illustrating a configuration of a preferred embodiment of a location tracking device according to the present invention.

FIG. 7 is a block diagram illustrating a configuration of a preferred embodiment of a location tracking device according to the present invention.

As shown in FIG. 7, the location tracking device 121 may include a location detector 710, a velocity calculator 720, a location estimator 730, and a change amount calculator 740. The location detector 710 obtains user location information about a location of a user based on the sensed information. The sensed information may include at least one of image captured by camera (110), distance value sensed by the infrared radiation distance measurement device or distance value sensed by a radio wave distance measurement device. The location detector 710 receives an image frame acquired through image capture of the user and detects a location of the user using the received image frame. The location detector 710 may detect the location of the user by recognizing a face region. The location detector 710 may recognize the face region based on an algorithm which uses face symmetry, an algorithm which uses hair color and face color, and an algorithm which uses face profile. The location detector 710 may calculate skin color information from the image frame to recognize a face region.

The velocity calculator 720 calculates a movement velocity of the user using the detected location of the user and at least one of previously detected locations of the user. The velocity calculator 720 may calculate the movement velocity using Expression 3.

The location estimator 730 predicts the location of the user at a time point which a predetermined time elapses using the detected location of the user and the calculated movement velocity. The location estimator 730 may predict respective locations of the user at N time points between each image frame capture time using algorithm 1 and Expression 6.

The change amount calculator 740 calculates a 3D image change amount based on the predicted location of the user and outputs the calculated 3D image change amount. The change amount calculator 740 calculates a 3D image change amount to allow a 3D image to be displayed appropriately at the location predicted by the location estimator 730 using Expression 1 and Expression 2. The change amount calculator 740 may then output the calculated 3D image change amount to the 3D image processing device 122. Here, the 3D image change amount may be one of a pixel displacement and a sub-pixel displacement.

Figure 8:
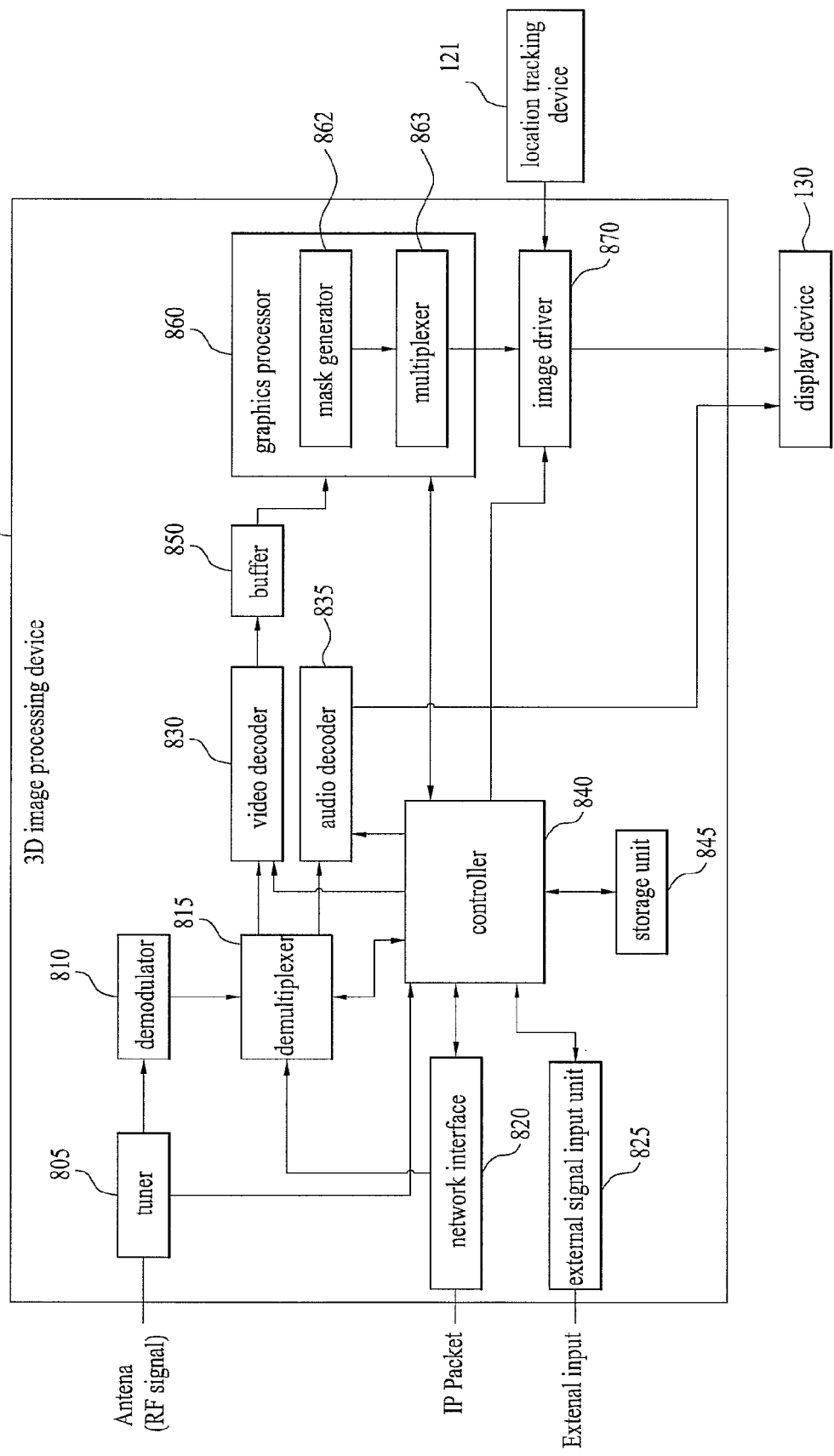
FIG. 8 is a block diagram illustrating a configuration of a preferred embodiment of the 3D image processing device.

FIG. 8 is a block diagram illustrating a configuration of a preferred embodiment of the 3D image processing device.

As shown in FIG. 8, the 3D image processing device 122 includes a tuner 805, a demodulator 810, a demultiplexer 815, a network interface unit 820, an external signal input unit 825, a video decoder 830, an audio decoder 835, a controller 840, a storage unit 845, a buffer 850, a graphics processor 860, and an image driver 870.

The tuner 805 selects a Radio Frequency (RF) broadcast signal corresponding to a channel selected by a user from among RF broadcast signals received through an antenna and converts the selected RF broadcast signal into an Intermediate Frequency (IF) signal or a baseband video or audio signal. The tuner 805 may receive an RF broadcast signal of a single carrier based on an Advanced Television Systems Committee (ATSC) method, or an RF broadcast signal of a plurality of carriers based on a Digital Video Broadcast (DVB) method.

In another embodiment of the present invention, the 3D image processing device 122 may include at least two tuners. When the 3D image processing device 122 includes at least two tuners, the first and second tuners similarly select RF broadcast signals corresponding to a channel selected by the user from among RF broadcast signals received through the antenna and convert the selected RF broadcast signals into IF signals or baseband video or audio signals.

The second tuner may sequentially select RF broadcast signals of all broadcast channels, stored via a channel memory function, from among received RF broadcast signals and convert the selected RF broadcast signals into IF signals or baseband video or audio signals. The second tuner may periodically perform a conversion process on all broadcast channels. Thus, the 3D image processing device 122 may display an image of a broadcast signal produced through conversion by the first tuner while providing a thumbnail of images of several channels produced through conversion by the second tuner. In this case, the first tuner may convert a main RF broadcast signal selected by the user into an IF signal or baseband video or audio signal, and the second tuner may sequentially or periodically select all RF broadcast signals other than a main RF broadcast signal and convert the selected RF broadcast signals into IF signals or baseband video or audio signals.

The demodulator 810 receives a Digital IF (DIF) signal produced through conversion by the tuner 805 and demodulates the DIF signal. In one example, if the DIF signal output from the tuner 805 is an ATSC signal, the demodulator 810 performs 8-Vestigial Side Band (VSB) demodulation on the DIF signal. In another example, if the DIF signal output from the tuner 805 is a DVB signal, the demodulator 810 performs Coded Orthogonal Frequency Division Multiple Access (COFDMA) demodulation on the DIF signal.

The demodulator 810 may also perform channel decoding. For channel decoding, the demodulator 810 may include a Trellis decoder, a deinterleaver, and a Reed-Solomon decoder to perform Trellis decoding, deinterleaving, and Reed-Solomon decoding, respectively.

After performing demodulation and channel decoding, the demodulator 810 may output a Transport Stream (TS) signal. A video signal, an audio signal or a data signal may be multiplexed in the TS signal. In one example, the TS signal may be a Moving Picture Experts Group-2 (MPEG-2) TS in which an MPEG-2 video signal and a Dolby AC-3 audio signal are multiplexed. More specifically, the MPEG-2 TS may include a 4-byte header and a 184-byte payload.

The demultiplexer 815 may receive a stream signal from the demodulator 810, the network interface unit 820 and the external signal input unit 825. The demultiplexer 815 may demultiplex the received stream signal into a video signal, an audio signal and a data signal and output the video signal, the audio signal and the data signal respectively to the video decoder 830, the audio decoder 835 and the controller 840.

The video decoder 830 receives the video signal from the demultiplexer 815 and decodes and stores the received video signal in the buffer 850. The video signal may include a 3D image signal.

The audio decoder 835 receives the audio signal from the demultiplexer 815 and decodes and outputs the received audio signal to the display device 130.

The network interface unit 820 receives packets from a network and transmits the packets to the network. More specifically, the network interface unit 820 receives IP packets carrying broadcast data from a service provision server through the network. The broadcast data includes content, an update message that provides content update notification, metadata, service information, and software code. The service information may include service information regarding a real-time broadcast service and service information regarding an Internet service. The Internet service is a service that may be provided through the Internet such as a Content on Demand (CoD) service, a YouTube service, an information service such as a weather, news, local information, or search service, an entertainment service such as a game service or a song room (karaoke) service, or a communication service such as a TV mail service or a TV Short Message Service (SMS) service. Thus, in the present embodiment, the digital broadcast receiver includes a network TV, a Web TV and a broadband TV. The broadcast service may include not only a broadcast service that is provided through terrestrial waves, satellites and cables but also an Internet service.

If the IP packet includes a stream signal, the network interface unit 820 may extract the stream signal from the IP packet and output the stream signal to the demultiplexer 815.

The external signal input unit 825 may provide an interface which can connect an external device and the 3D image processing device 122 to each other. The external device refers to a variety of types of video or audio output devices, such as a Digital Versatile Disc (DVD) player, a Blu-ray player, a game console, a camcorder and a computer (e.g., a notebook computer). The 3D image processing device 122 may display video and audio signals transmitted from the external signal input unit 825 and may store or use data signals.

The controller 840 executes a command and performs an operation associated with the 3D image processing device 122. For example, the controller 840 may control data reception and processing and signal input and output between components of the 3D image processing device 122 using commands found in the storage unit 845. The controller 840 may be implemented as a single chip, a plurality of chips, or a plurality of electric components. For example, a variety of architectures including a dedicated or embedded processor, a single purpose processor, a controller, an Application Specific Integrated Circuit (ASIC), or the like may be used for the controller 840.

The controller 840 executes computer code together with an Operating System (OS) and performs operations for generating and using data. The OS is generally known and therefore a detailed description thereof is omitted. An example of the OS may include Windows OS, Unix, Linux, Palm OS, DOS, Android, and Mac OS. The OS, other computer code, and data may be present within the storage unit 845 which is connected to the controller 840 and which operates under control of the controller 840.

The storage unit 845 generally provides locations for storing program code and data used by the 3D image processing device 122. For example, the storage unit 845 may be implemented as a Read-Only Memory (ROM), a Random Access Memory (RAM), a hard disk drive, etc. The program code and data may be stored in a separable storage medium and, when needed, may be loaded or installed onto the 3D image processing device 122. The separable storage medium may include a CD-ROM, a PC card, a memory card, a floppy disk, a magnetic tape and a network component.

The graphics processor 860 controls the display device 130 so as to display video data stored in the buffer 850. The graphics processor 860 may include a mask generator 862 and a multiplexer 863.

The mask generator 862 generates a view mask with respect to a 3D image. The mask generator 862 may generate a mask α of each view using the following Expression 7.

$$\alpha(i,k) = W(K - V_i) \qquad \text{[Expression 7]}$$

Figure 9:
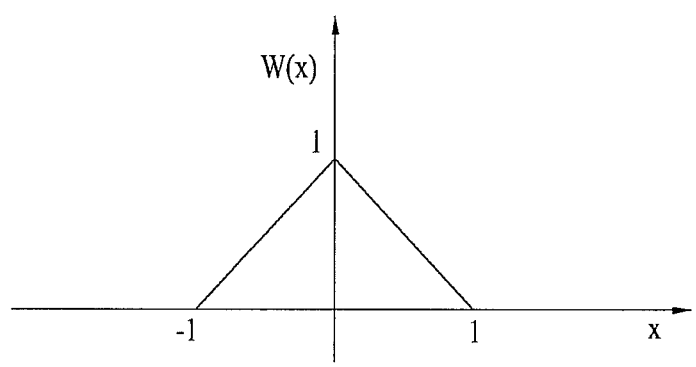
FIG. 9 illustrates a graph of a function W(x).

Here, 'i' denotes a horizontal number of a sub-pixel, '$V_i$' denotes a view number of the sub-pixel i when the period of a 3D image pixel is Q, and 'k' is a view number. A graph of a function W(x) is illustrated in FIG. 9.

The multiplexer 863 may determine a final color of a pixel using the view mask generated by the mask generator 862. The multiplexer 863 may determine the final color $MC_i$ using the following Expression 8.

$$MC_i = \sum_{k=0}^{N-1} \alpha(i,k) * C(i,k) \qquad \text{[Expression 8]}$$

Here, 'C(i, k)' denotes the color of the sub-pixel i of an image of view number k.

The image driver 870 may determine a sub-pixel at which the final color $MC_i$ is to be displayed based on the 3D image change amount calculated by the location tracking device 121 and output a control signal to the display device 130 so as to display the final color $MC_i$ at the determined sub-pixel. Here, the final color $MC_i$ may be displayed at a sub-pixel located at a position to which the sub-pixel i moves according to the 3D image change amount.

The present invention can be embodied as computer readable code stored in a computer readable medium provided in the image display apparatus. The computer readable medium includes any type of storage device that stores data which can be read by a computer. Examples of the computer readable medium include Read Only Memory (ROM), Random Access Memory (RAM), CD-ROMs, magnetic tapes, floppy disks, optical data storage devices, and so on. The computer readable medium can also be embodied in the form of carrier waves (for example, in the form of signals transmitted over the Internet). The computer readable medium can also be distributed over a network of coupled computer devices so that the computer readable code is stored and executed in a distributed fashion.

As is apparent from the above description, a system, apparatus, and method for displaying a 3-dimensional image and a location tracking device according to the present invention have a variety of advantages. For example, it is possible to extend viewing angle since, when a user is in motion, a display location of a 3D image is changed according to movement of the user. In addition, it is possible to prevent the occurrence of 3D image flickering and crosstalk when the user is in motion since a location of the user is predicted in advance and a display location of a 3D image is changed according to the predicted location of the user.

Although the present invention has been illustrated and described above with reference to the specific embodiments, the present invention is not limited to the specific preferred embodiments and it will be apparent to those skilled in the art that various modifications can be made to the embodiments without departing from the spirit and scope of the present invention as disclosed in the accompanying claims and such modifications are included in the scope of the claims.

What is claimed is:

1. A 3-dimensional (3D) display method comprising:
    capturing images of a user;
    detecting a current and previous position of the user using the captured images;
    calculating a movement speed of the user using the detected current and previous position of the user;
    estimating a position of the user after a predetermined time using the detected current position of the user and the calculated movement speed of the user;
    determining a 3D image change amount based on the estimated position of the user;
    generating a view mask for the 3D image;
    determining a final color of a sub-pixel using both the generated view mask and a color of a sub-pixel of a view image included in the 3D image, wherein the view image is one of the captured images; and
    displaying a perceived 3D image based on the determined 3D image change amount and the determined final color of the sub-pixel,
    wherein the 3D image change amount is one of a pixel displacement or a sub-pixel displacement, and
    wherein the predetermined time includes a delay time caused by all of a camera capture delay, a detecting process delay and an image driver frame rate delay.

2. The 3D display method according to claim 1, wherein displaying the perceived 3D image includes displaying the perceived 3D image by moving, based on the 3D image change amount, one of a pixel position at which a pixel color included in the 3D image is displayed or a sub-pixel position at which a sub-pixel color included in the 3D image is displayed.

3. The 3D display method according to claim 1, wherein estimating a position of the user includes predicting a future location of the user at at least one time point between when the predetermined time elapses and when an image frame next to the image frame is captured.

4. The 3D display method according to claim 1, wherein estimating a position of the user includes predicting a location of the user at each time point at intervals of a predetermined period between when the predetermined time elapses and when an image frame next to the image frame is captured.

5. The 4D display method according to claim 4, wherein the predetermined period is less than a period at intervals of which the 3D image changes.

6. The 3D display method according to claim 1, wherein the predetermined time is a time that elapses until the 3D image is displayed after the image frame is captured.

7. The 3D display method according to claim 1, wherein the perceived 3D image is a 2-view image or a multi-view image.

8. The 3D display method according to claim 1, wherein displaying the perceived 3D image includes displaying the final color of the sub-pixel at a sub-pixel located at a position to which the sub-pixel has moved according to the 3D image change amount.

9. The 3D display method according to claim 1, wherein a mask α of each view is generated using the following equation:

$$\alpha(i,k) = W(K - V_i),$$

where denotes a horizontal number of a sub-pixel, '$V_i$' denotes a view number of the sub-pixel i when a period of a 3D image pixel is Q, and 'k' denotes a view number.

10. The 9D display method according to claim 9, wherein a final color MG is determined using the following equation:

$$MC_i = \sum_{k=0}^{N-1} \alpha(i, k) * C(i, k),$$

where '$C(i, k)$' denotes a color of the sub-pixel i of an image of view number k.

11. The 3D display method according to claim 1, wherein the view image is an image captured through a plurality of cameras having specific distances and angles.

12. A 3-dimensional (3D) display apparatus comprising:
    a camera to capture images of a user;
    a location tracking unit to detect a current and previous position of the user using a video frame included in the captured images, to calculate a movement speed of the user using the detected current and previous position of the user, to estimate a position of the user after a predetermined time using the detected current position of the user and the calculated movement speed of the user and to determine a 3D image change amount based on the estimated position of the user;
    a mask generator to generate a view mask for the 3D image;
    a multiplexer to determine a final color of a sub-pixel using both the generated view mask and a color of a sub-pixel of a view image included in the 3D image, wherein the view image is one of the captured images; and
    an image processing unit to control to display a perceived 3D image based on the determined 3D image change amount and the determined final color of the sub-pixel,
    wherein the 3D image change amount is one of a pixel displacement or a sub-pixel displacement, and
    wherein the predetermined time includes a delay time caused by all of a camera capture delay, a detecting process delay and an image driver frame rate delay.

13. The 3D display apparatus according to claim 12, wherein the location tracking unit includes:
    a location estimator to predict a future location of the user at a time point at which the predetermined time elapses using the detected current position of the user and the calculated movement speed of the user; and a change amount calculator to determine the 3D image change amount based on the predicted future location of the user, and to output the calculated 3D image change amount.

14. The 12D display apparatus according to claim 12, wherein the image processing unit controls to display the perceived 3D image by moving one of a pixel position at which a pixel color included in the 3D image is displayed or a sub-pixel position at which a sub-pixel color included in the 3D image is displayed, based on the 3D image change amount.

15. The 12D display apparatus according to claim 12, wherein the mask generator generates a mask α of each view using the following equation:

$$\alpha(i,k) = W(K - V_i),$$

where 'i' denotes a horizontal number of a sub-pixel, '$V_i$' denotes a view number of the sub-pixel i when a period of a 3D image pixel is Q, and 'k' denotes a view number.

16. The 3D display apparatus according to claim 15, wherein the multiplexer determines a final color MG using the following equation:

$$MC_i = \sum_{k=0}^{N-1} \alpha(i,k) * C(i,k),$$

where 'C(i, k)' denotes a color of the sub-pixel i of an image of view number k.

17. The 3D display method according to claim 12, wherein the view image is an image captured through a plurality of cameras having specific distances and angles.

* * * * *